Dec. 8, 1931.  J. H. STANSBURY  1,835,190
MACHINE FOR OPERATING ON FRUITS AND THE LIKE
Original Filed July 25, 1927  5 Sheets-Sheet 1

Dec. 8, 1931. J. H. STANSBURY 1,835,190
MACHINE FOR OPERATING ON FRUITS AND THE LIKE
Original Filed July 25, 1927   5 Sheets-Sheet 4

Inventor
John H. Stansbury,
By Prentiss, Stone & Boyden,
Attorneys

Patented Dec. 8, 1931

1,835,190

UNITED STATES PATENT OFFICE

JOHN HERBERT STANSBURY, OF FRUITLAND, MARYLAND, ASSIGNOR OF ONE-HALF TO RALPH O. DULANY, OF FRUITLAND, MARYLAND

MACHINE FOR OPERATING ON FRUITS AND THE LIKE

Application filed July 25, 1927, Serial No. 208,362. Renewed August 7, 1929.

This invention relates to machines for removing stems and the like from small fruit, especially berries.

Machines have heretofore been devised for stemming such fruits as grapes, cherries, gooseberries, etc. but so far as I am aware, the problem of producing a machine for removing the stems and caps from strawberries has so far baffled all efforts.

The difficulty lies in the fact that strawberries vary so widely in shape, size, and degree of softness, and in the further fact that the fruit is tender and easily mashed. The problem of handling strawberries in a machine is, therefore, wholly different from that of handling any other fruit of which I am aware, although the principles embodied in the present invention may be applicable to other types of fruit and vegetables.

The general object of the invention is to provide an automatic machine into which the strawberries to be capped and stemmed may be fed in bulk, and which will effectively and rapidly remove the stems and caps without crushing or injuring the fruit. A further object is to provide such a machine that is simple in construction and operation, adjustable for different varieties of berries and of comparatively small cost.

To this end, the invention comprises the construction and arrangement of parts hereinafter described and claimed and illustrated in the accompanying drawings, in which:—

Figure 1 is a side elevation of my improved machine complete, parts being broken away;

Figure 1ᵃ is a fragmentary side elevation on an enlarged scale, showing the feeding mechanism, parts being in section;

Figure 5ᵃ is a perspective view of one of the bearing blocks which I employ;

The operative elements which embody the essential principle on which the machine operates consists of a pair of substantially horizontal rollers, constituting pinching mechanism, and a conveyor belt extending longitudinally thereof. A belt and pair of rollers constitutes an operative unit, and as many of these units as desired can be assembled in a single machine and driven from the same source of power. In the drawings, I have illustrated, by way of example, a machine having six conveyor belts and six pairs of rollers, but obviously any desired number of these elements may be employed.

Referring to the drawings in detail, the improved machine comprises a suitable frame 1, supported on legs 2, suitably braced by horizontal bars 3, as shown.

Extending across the main side members of the frame and supported thereby are a series of transverse frame members shown as angle irons 4. These are uniformly spaced apart a suitable distance as shown, and serve to support the bearings in which the rollers are journaled, it being understood that these rollers are relatively long and slender, and have to be supported at relatively close intervals in order to render them sufficiently rigid.

Figures 4, 5:
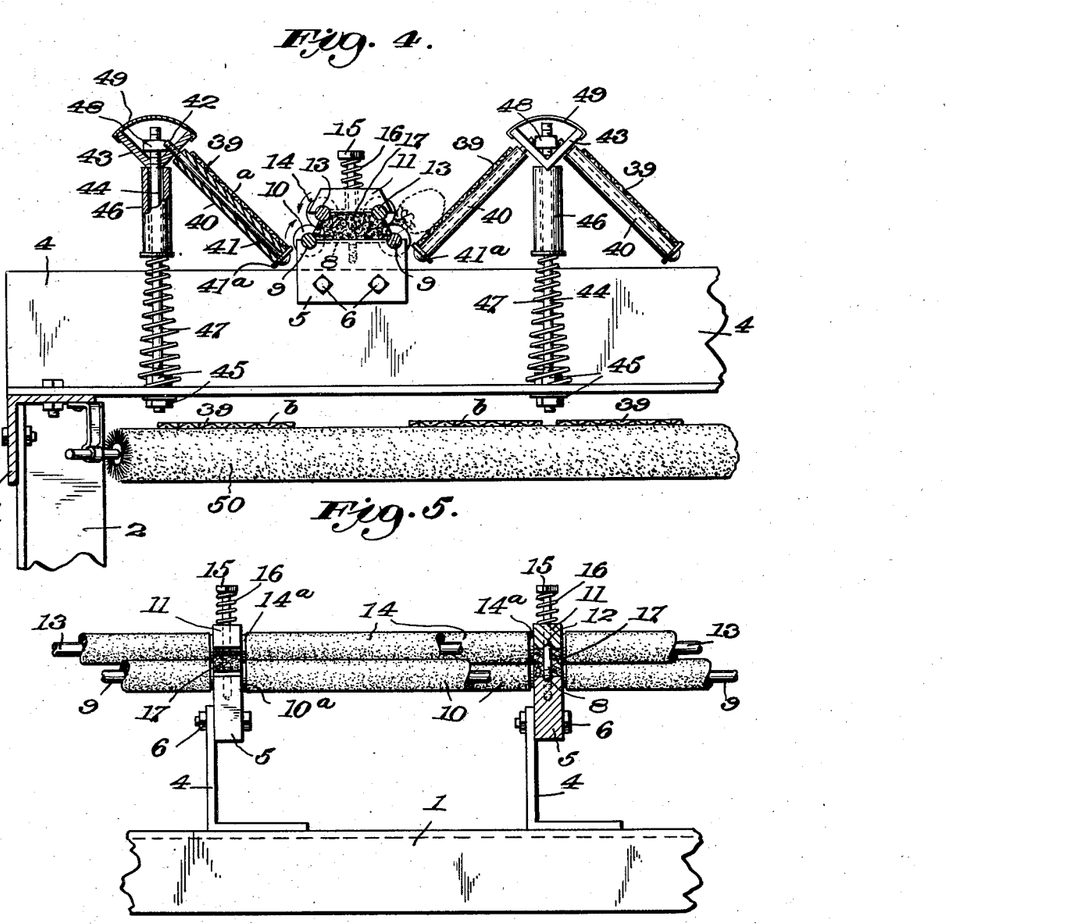
Figure 4 is a partial transverse section on an enlarged scale, showing some of the operative parts of the machine.
Figure 5 is a fragmentary side elevation of the rollers and supporting means therefor, parts being broken away and other parts being shown in section.
Figure 5A:
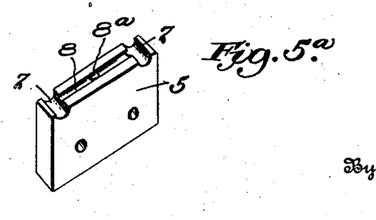
Figure 6:
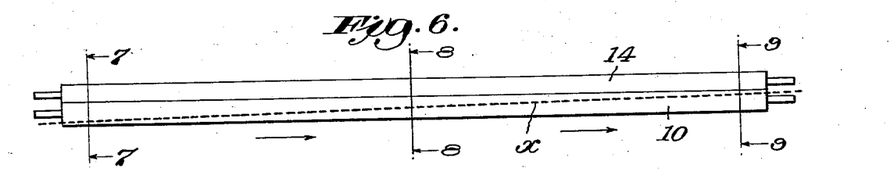
Figure 6 is a diagrammatic view in the nature of a side elevation illustrating the relation of the conveyor belt to the rollers.

Secured to the upstanding member of each angle bar 4, as by means of bolts 6, is a bearing block 5, shown in Figure 4 and more clearly illustrated in Figure 5ª. This bearing block has formed in its upper surface a pair of spaced semi-cylindrical seats or bearings 7, and preferably extending along the upper edge of the block between these seats is an oil groove 8. A screw threaded socket 8ª is also formed in the upper surface of the block for the purpose of receiving a bolt or screw, hereinafter described.

In the preferred form of the invention, each roller comprises a central shaft made of steel or the like, covered with a relatively thick layer of soft elastic material such as rubber. In practice, a special rubber composition, having just the right degree of softness and elasticity has been employed in order to get the best results.

Referring again to Figure 4, a pair of rollers, each comprising a shaft 9 and a rubber covering or body 10, are journaled in the seats or bearings 7, and extend from one end of the machine to the other.

A pair of similar rollers, each comprising a shaft 13 and rubber covering or body 14, are superposed upon the rollers 10, preferably being offset somewhat from the vertical, as shown, and the shafts of these upper rollers are journaled in seats or bearings formed in an upper bearing block 11, resting upon said shafts. In the lower surface of this upper bearing block 11 is preferably formed an oil groove 12 similar to the groove 8, and the block 11 is also provided with a central opening through which loosely passes a screw or bolt 15. Interposed between the head of this bolt and the block 11 is a helical spring 16. It will thus be seen that when the bolt 15 is inserted through the block 11, and screwed into the socket 8ª in the block 5, the spring 16 is compressed and serves to resiliently urge the two blocks together, and at the same time to maintain the surfaces of the two pairs of rollers 10 and 14 in contact with each other.

The problem of proper lubrication of the bearings of these rollers is a difficult one, because of the necessity for preventing oil or grease getting onto the surface of the rollers themselves. As shown in the drawings, I provide a felt pad 17 and interpose this between the two blocks 11 and 5. Oil applied to this pad through the opening surrounding the bolt 15 in the block 11 is distributed by it to the four bearings, the grooves 8 and 12 assisting in such distribution. In order to prevent the oil from working its way onto the surface of the rollers, I place upon the respective shafts 9 and 13 at each side of the bearing, metal disks 10ª and 14ª, as shown in Figure 5, these disks being preferably slightly smaller in diameter than the diameter of the rollers.

Figure 2:
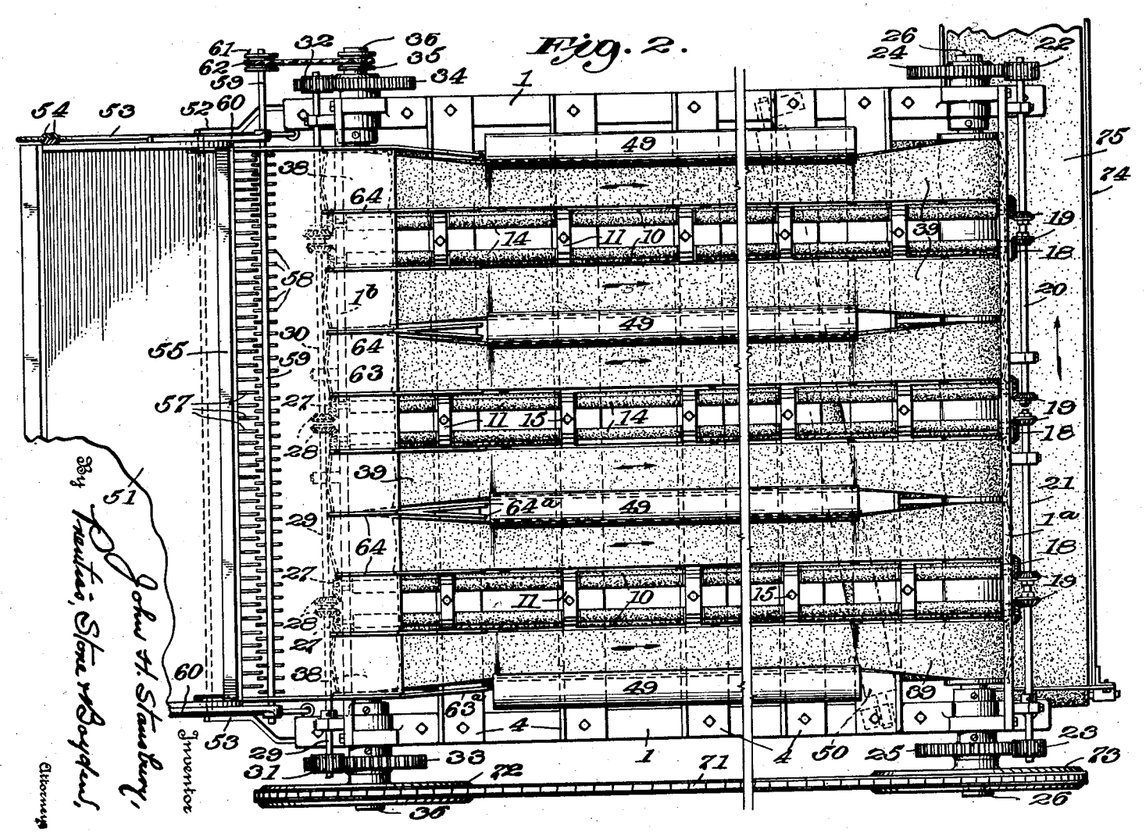
Figure 2 is a plan view of the machine shown in Figure 1.

Referring now to Figure 2, it will be seen that the various pairs of rollers 10 and 14 extend the full length of the machine, being journaled in a suitable number of bearings such as 5 and 11, at intervals throughout their length and also being journaled in and extending through transverse end plates 1ª and 1ᵇ. To the projecting ends of the lower set of rollers 10 are secured adjacent the member 1ª, beveled pinions 18, and arranged to mesh with these pinions are a series of similar beveled pinions 19 secured to aligned shafts 20 and 21 carrying at their outer ends pinions 22 and 23, meshing respectively with gears 24 and 25, secured to a main transversely extending shaft 26. Thus the lower set of rollers are rotated.

Similarly the upper set of rollers 14 carry at their ends adjacent the end plate 1ᵇ beveled pinions 27, arranged to mesh with similar pinions 28, carried on aligned shafts 29 and 30, having at their ends pinions 31 and 32, meshing respectively with gears 33 and 34, carried by a second main transverse shaft 36. Thus, the upper set of rollers 14 is driven. It will, of course, be understood that the direction of rotation of the respective rollers is as indicated by the arrows in Figure 4 and also in Figures 7, 8 and 9.

Figure 3:
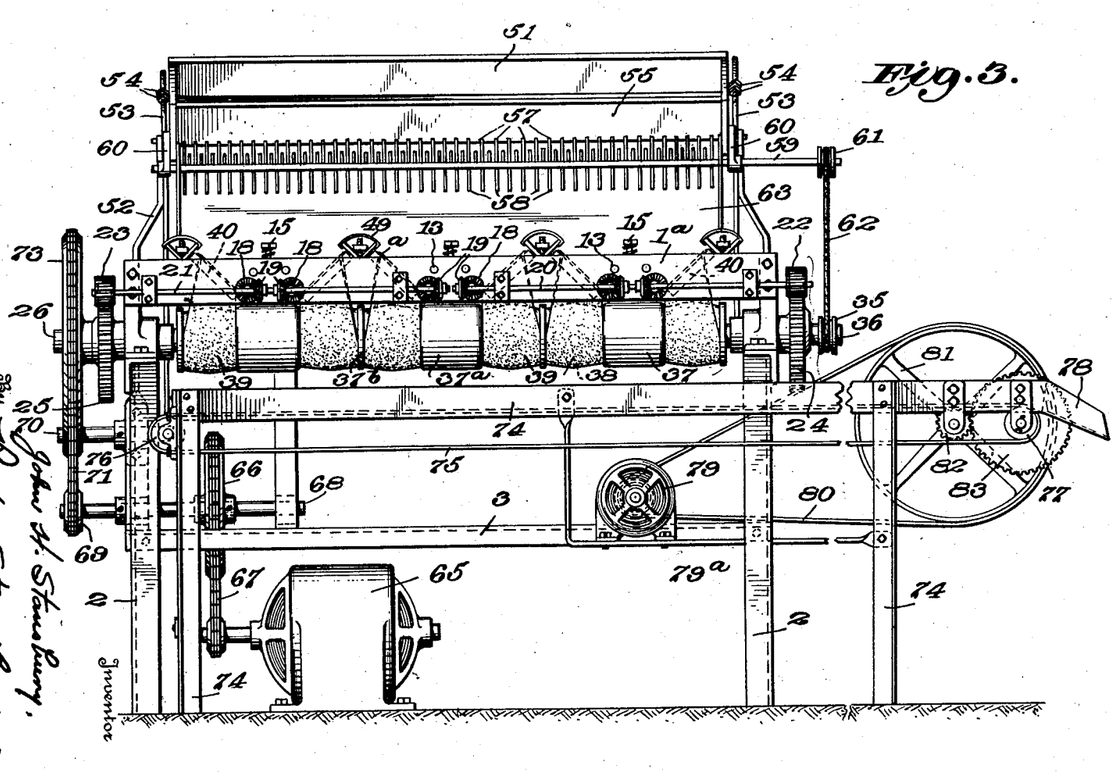
Figure 3 is an elevation of the discharge end thereof.

Secured to the main shafts 26 and 36 are rolls 37 and 38, each of these rolls being shaped to form a series of crown pulleys having blank spaces 37ª, and flanges 37ᵇ, between them as clearly shown in Figure 3. Around opposite pairs of these crown pulleys pass a series of endless conveyor belts designated in their entirety by the reference numeral 39. It will be seen that these belts are disposed with their upper runs extending longitudinally of the pairs of rollers 10 and 14, and that each belt has one edge adjacent one such pair of rollers.

The lower runs of these belts are flat and lie in a single plane, as best shown at b in Figure 4. The upper runs of the belts, adjacent the rollers 10 and 14, are, however, transversely tilted so that they incline downwardly toward the respective rollers.

As a means for thus tilting transversely the upper runs of the belts, I provide a series of pins or bolts 41, (see Figure 4) having their screw threaded ends set into the sides of angle bars 43, as indicated at 42. These angle bars are supported edge downward in such a position that their flanges, and also the pins or bolts 41, extend at substantially 45° to the horizontal. Loosely fitting over each pin or bolt 41 is a tube or sleeve 40 and between the lower end of such sleeve and the head of the bolt is interposed a disk or washer 41ª of a diameter somewhat larger than the diameter of the sleeve. This disk thus provides an annular flange projecting beyond the sleeve and serving to support the lower edge of the belt and prevent it from slipping downwardly. In other words, the bolt 41, sleeve 40 and disk 41ª constitutes a guide for supporting the upper run of the belt in the desired position. By reference to Figure 4, it will be seen that a series of these belt guides is arranged at each side of the roller assembly. In the middle of the machine, these guides are carried by both sides or flanges of the angle bars 43, as clearly shown at the right of Figure 4, while at the side of the machine, these guides are of course carried by only one side of the angle bar. Each angle bar 43 is supported by means of two upstanding rods 44, having screw threaded upper ends on which work nuts 48. These rods 44 are rigidly secured at their lower ends to the cross members 4, by means of lock nuts 45. The angle bars 43 are provided with central holes or openings which freely slip over the ends of the rods 44, and the bars rest upon free floating sleeves 46 threaded on the rods 44 and themselves supported by compression springs 47 surrounding the rods. It will thus be seen that by screwing down the nuts 48, the springs 47 may be compressed to a greater or lesser extent and the height or elevation of the bars 43 adjusted as desired. Moreover, it will be understood that one end of each of these bars can be raised or lowered relative to the other end so as to cause the bars to assume a slight angle relative to the horizontal.

Figures 1, 1A:
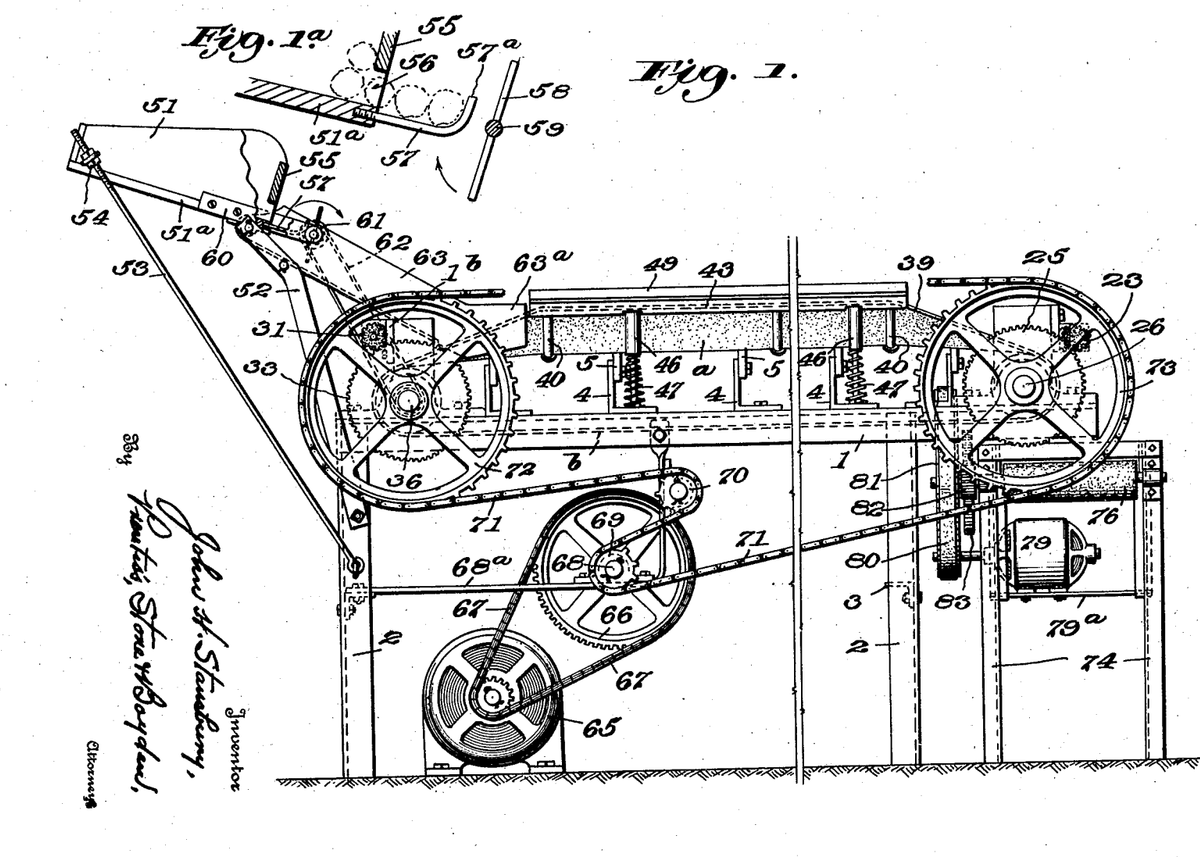

In order to prevent fruit or foreign matter from accumulating in the upturned trough shaped angle bars 43, I preferably cover each angle bar with a convex cap or roof 49, as clearly shown in Figures 1, 2 and 4. Thus, any berries falling onto these convex covers will roll off onto the belts 39.

In order to clean the surface of the belts, and prevent material from clinging to or accumulating on them, I preferably provide a rotary brush 50, suitably journaled in the machine at such a height as to engage the lower runs of the belts, as shown in Figure 4. This brush is not positively driven, but is preferably arranged at a slight angle to the belts, as indicated in dotted lines in Figure 2, and is rotated by the frictional engagement of the belts therewith.

In order to deposit the berries upon the travelling belts uniformly and continuously, I have devised the improved feeding device shown at the left of Figures 1 and 2 and also illustrated in Figures 1ª and 3. This feeding device comprises a suitable hopper 51, preferably extending the full width of the machine, and pivotally supported on a pair of brackets 52 and adjustable brace rods 53. By turning the nuts 54 at the upper ends of these rods the inclination of the floor 51ª of the hopper may be varied, as required.

Across the lower end of the hopper extends a plate or bar 55, this bar being spaced from the bottom 51ª of the hopper a suitable distance to provide a discharge opening 56, as clearly shown in Figure 1ª. Carried by the edge of the hopper bottom immediately adjacent this discharge opening is a series of spaced fingers 57. These fingers 57 incline downwardly in the same general direction as the bottom of the hopper, but are provided with upturned ends 57ª which constitute a kind of cradle in which the berries issuing from the discharge opening 56 are momentarily held. A transverse shaft 59 is journaled in brackets 60 adjacent the ends of the fingers 57, and this shaft carries one or more series of radially extending pins spaced axially along the shaft in a manner corresponding to the spacing of the fingers 57 but staggered with relation thereto, so that as the shaft rotates in the direction indicated by the arrow, the pins 58 are caused to enter between the fingers 57 from below and lift off the berries resting on the same adjacent the ends thereof.

The shaft 59 is rotated by means of a belt 62 passing around a pulley 61 on the shaft 59 and around another pulley 35 on the main shaft 36.

Underneath the fingers 57 and shaft 59 above described is disposed a wide trough or chute 63 which extends from the hopper down to the conveyor belts and serves to receive the fruit fed out by the pins 48 and carry it to the belts. By reference to Figure 2, it will be seen that guide flanges 63ª are carried by the chute at the sides of the belts and that other upstanding guide flanges or fins 64 extending between the several pairs of belts are also provided to guide and direct the fruit onto the respective belts. Some of these intermediate upstanding guide flanges are bifurcated and divergent at their lower ends, as indicated at 64ª, in order to closely hug and conform to the profile of the belts at these points.

The machine as a whole may be driven from any suitable source of power, such as an electric motor 65. As shown in the drawings, by way of illustration, this motor is geared by means of a sprocket chain 67 to a sprocket wheel 66, carried by a back shaft 68, mounted in a suitable bracket 68ª. On the back shaft 68 is also a sprocket 69, and around this sprocket and an idler sprocket 70, and also around sprockets 72 and 73 secured to the shafts 26 and 36, extends a sprocket chain 71.

Means are preferably provided for collecting and carrying away the berries discharged from the belts 39, after leaving the stemming rollers, and to this end, I preferably construct a transversely extending conveyor. This may be supported on a suitable frame work 74 and comprises a travelling belt 75 passing around rollers 76 and 77, a discharge spout 78 being provided adjacent the roller 77. The roller 77 may be driven by means of a gear wheel 83 meshing with a pinion 82 secured to a belt wheel 81 to which power is transmitted from an auxiliary electric motor 79 by means of a belt 80, the motor 79 being supported on a suitable bracket 79ª. Of course means may be provided for driving this conveyor from the main motor 65, if desired.

Figures 7, 8, 9, 10, 13:
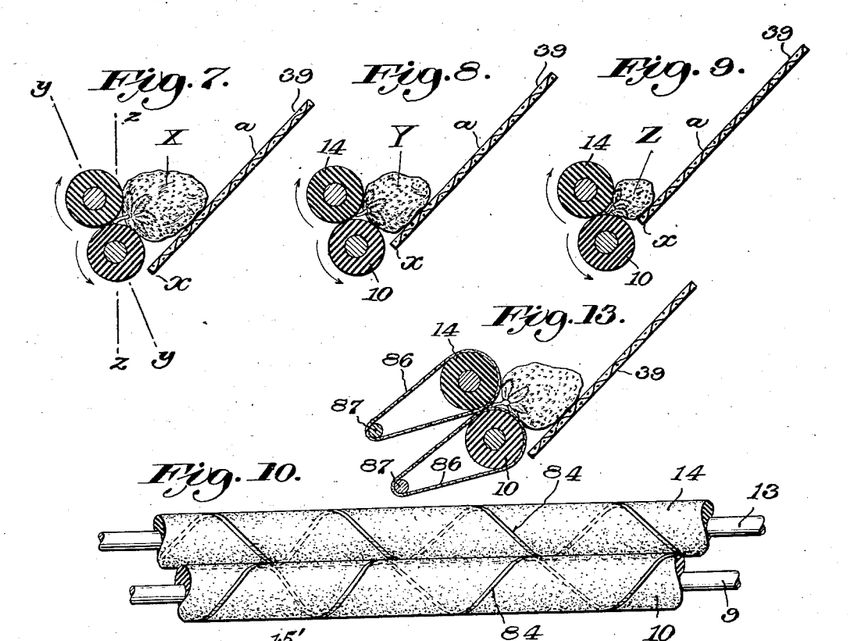
Figures 7, 8 and 9 are enlarged transverse sections through a pair of rollers and the conveyor belt, these sections corresponding in position respectively to the lines 7—7, 8—8, and 9—9, of Figure 6.
Figure 10 is a fragmentary side elevation showing a somewhat modified form of roller which I may employ.
Figure 13 is a view similar to Figure 7, but showing a further modified construction.

The principle and operation of the machine will now be briefly described. We will refer first to Figures 6, 7, 8 and 9. At the outset, it will be noted that the pair of stemming rollers 10 and 14 are preferably not disposed directly one above the other in the same vertical plane, but that the upper one is somewhat offset relative to the lower, so that the axes of the two rollers lie in a plane making an angle with the vertical. This angle is indicated in Figure 7 by the broken lines $y$ and $z$ and it has been found in practice that the best results can be obtained with an angle of from 20 to 25°. It will also be noted that the upper run $a$ of the belt 39 is inclined at an angle of approximately 45°, and it will be seen that there is thus formed a kind of V-shaped trough, one side of which is made up of the rollers 10 and 14, and the other side of which consists of the belt.

The berries to be stemmed and capped are simply dumped into the hopper 51, from which they are discharged through the opening 56 onto the fingers 57. From these fingers they are lifted and deposited a few at a time into the chute 63, down which they roll and onto the traveling conveyor belts 39.

Considering a single unit such as shown in Figure 7, it will be seen that the berries are carried along by the belt and caused to travel and tumble as they move, so that different sides of each berry are constantly presented toward the bite of the rollers. Incidentally, it will be observed that because of the peculiar construction of bearings shown in Figure 4, there is no obstruction in the bite of the rollers at any point, and the rollers are yieldingly held in continuous contact throughout their whole length. As each berry travels along the bite of the rollers, being tumbled as it goes, it will, at some point in its journey, occupy such a position that the stem or edge of the cap is caught between the rollers and stripped from the berry. It will be further understood that the rollers are of such comparatively small size (for example 3/8ths of an inch in diameter) that the bite between them is not sufficiently wide to admit of a berry being drawn in. The cap and stem are simply pinched off, and the berry continues its journey along the rolls until it is discharged from the end of the belt onto the conveyor 75.

Referring again to Figures 6, 7, 8 and 9, it will be observed that while the rollers 10 and 14 are preferably horizontal and cylindrical, the lower edge of the upper run $a$ of the belt is preferably not quite horizontal but is slightly inclined to the axes of the rollers. This is indicated by the dotted line $x$ in Figure 6. Such inclination can be produced by properly manipulating the nuts 48 which hold the angle bars 43 and support the upper runs of the belts (see Figure 4).

The result of this slight inclination of the lower edge of the belt relative to the bite of the rollers is clearly shown in Figures 7, 8 and 9, Figure 7 representing the lower end of the belt, and Figure 9 the higher end. From a study of these figures, it will be observed that the horizontal distance from the belt to the bite of the rollers progressively varies from one end of the rollers to the other, this distance being greatest at the lower end, as shown in Figure 7, and least at the upper end, as shown in Figure 7. Consequently, although a small berry at the position of Figure 7 would not stand high enough for its cap to enter the bite of the roller, and while a very large berry, in the position shown in Figure 9, would stand too high for its cap to enter the bite of the rollers, it will be seen that as a number of berries of miscellaneous sizes are carried along the rollers by the belt, the larger berries will reach an operative position at the lower portion of the belt, as indicated at Figure 7, and the smaller berries will reach an operative position at the upper end of the belt, as indicated at Figure 9, while the berries of intermediate size will find their proper position at intermediate points in the length of the rollers, such, for example, as illustrated at the center in Figure 8.

While I have illustrated the belt as moving in a direction such that the large berries are first operated upon and the smaller ones carried along until they reach the higher portions of the belt before entering the bite of the rollers, it is obvious that the arrangement might be the reverse of this, and that the small berries might be brought into operative position first. In any event, it will be seen that by the simple expedient of arranging the lower edge of the belt at a slight angle to the horizontal, the usual run of berries varying widely in size and shape can be successively brought into the bite of the rollers and successfully operated upon.

While I have shown and described, and have found in practice that rollers having a surface of uniform texture operate efficiently, I have also found it advantageous in some cases to employ rollers constructed as shown in Figure 10. In this figure, the rollers are the same except that I wind a fine wire spirally around each, as indicated at 84. This wire increases the biting or pinching effect of the rollers.

Figure 11:
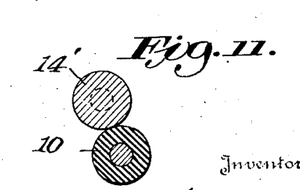
Figure 11 is a transverse section through a pair of rollers indicating that these rollers may be of different material.

Also while I have described both rollers as being formed of rubber or similar elastic material, it may in some cases suffice to employ only one elastic roller, while the other roller is made of hard material such as metal. This is indicated at 14' in Figure 11.

Figure 12:
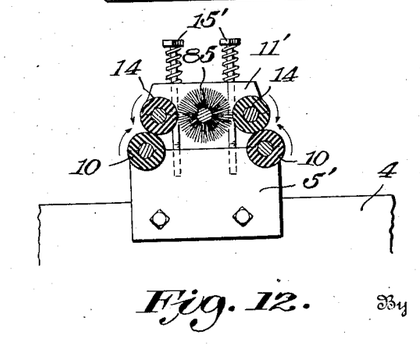
Figure 12 is a fragmentary transverse section somewhat similar to Figure 4, but showing a slightly modified arrangement.

Finally, under some conditions, it may be found necessary to provide means for cleaning the rollers and for preventing the caps and stems from adhering thereto. In Figure 12, I have illustrated how this can be done. I provide bearing blocks 5' and 11', and instead of having a single bolt 15 passing down through the center of the blocks, I provide two bolts 15', spaced apart so as to accommodate between them the shaft of a rotary brush 85. This brush is arranged to scrape the surface of both upper rollers 14 and keep them clean. The brush may be driven in any suitable manner.

As a still further modification, I may employ the arrangement of pinching mechanism illustrated in Figure 13. In this construction, I provide traveling aprons 86, of light duck, or the like, each of which passes over one of the rubber rollers, and around an idler 87, suitably mounted, and disposed parallel with the roller. This cloth covering does not become as slippery as the rubber itself does, when wet with fruit juice, and is also easier to keep clean. Otherwise, the operation of this modification is the same.

In the following claims, where I use the word "roller", it will be understood that I mean to include either a naked roller, or a roller sheathed and covered by a traveling apron, as shown in Figure 13.

What I claim is:—

1. In a berry capping and stemming machine, a pair of substantially horizontal rollers of uniform diameter mounted one above the other with their surfaces in contact, means for rotating said rollers, and mechanism independent of said rollers for causing the berries to travel along the bite of said rollers.

2. In a berry capping and stemming machine, a pair of substantially horizontal rollers mounted with their surfaces in contact, means for rotating said rollers, and traveling means for supporting the berries and for causing them to roll and tumble along the bite of said rollers, so that the part of each berry in contact with the rollers is constantly changed as the berries travel.

3. In a berry capping and stemming machine, a pair of substantially horizontal rollers mounted with their surfaces in contact, means for rotating said rollers, and a conveyor belt extending longitudinally of and adjacent the bite of said rollers, and serving to carry the berries along the same, said belt constituting a support on which the berries rest.

4. In a berry capping and stemming machine, a pair of substantially horizontal rollers mounted one above the other with their surfaces in contact, means for rotating said rollers, and a conveyor belt extending longitudinally of and adjacent the bite of said rollers, and serving to carry the berries along the same, said belt being transversely inclined toward the rollers, whereby the berries are caused to move by gravity into contact with said rollers.

5. In a berry capping and stemming machine, a pair of substantially horizontal rollers mounted with their surfaces in contact, and disposed one above the other, so that the bite is at the side, means for rotating said rollers, and a conveyor belt extending longitudinally of and adjacent the bite of said rollers, and serving to cause the berries to travel along the same.

6. In a berry capping and stemming machine, a pair of substantially horizontal rollers mounted with their surfaces in contact, and disposed one above the other, so that the bite is at the side, means for rotating said rollers, and a conveyor belt extending longitudinally of and adjacent the bite of said rollers, and serving to cause the berries to travel along the same, said belt being transversely inclined toward the rollers, whereby the berries are caused to move by gravity into such bite.

7. In a berry capping and stemming machine, a pair of substantially horizontal rollers, mounted with their surfaces in contact, and disposed one above the other with their axes lying in a plane forming an angle with the vertical, means for rotating said rollers, and a conveyor belt extending longitudinally of and adjacent said rollers, said conveyor belt being likewise inclined transversely and disposed at an angle to the vertical, whereby said pair of rollers and belt together form a trough along which the berries are caused to travel.

8. In a berry capping and stemming machine, a substantially horizontal trough along which the berries are caused to travel, one side of said trough being made up of a pair of parallel rollers, arranged one above the other with their surfaces in contact, and the other side of the trough consisting of a conveyor belt.

9. In a machine of the class described, the combination with a pair of substantially horizontal rollers mounted one above the other, with their surfaces in contact, so that the bite is at the side, of a conveyor belt extending longitudinally of said rollers and inclined transversely toward them, with its lower edge adjacent the bite between them, said lower edge of the belt being disposed at an acute angle with the line of contact of said rollers.

10. In a berry capping and stemming machine, the combination with a pair of substantially horizontal rollers mounted one above the other, with their surfaces in contact, so that the bite is at the side, means for supporting the berries adjacent the bite of the rollers and conveying them along the same, said supporting and conveying means being disposed further away from the line of contact of the rollers at one end than at the other, whereby a progressively varying space is provided between the said supporting and conveying means, and the bite of the rollers.

11. A berry capping and stemming machine comprising a pair of rollers mounted one above the other with their surfaces in contact, at least one of said rollers comprising a metallic core or shaft surrounded by a body portion of soft elastic material, and means for causing berries to travel along the bite of said rollers.

12. A berry capping and stemming machine comprising a pair of relatively long and slender rollers, at least one of which consists of a shaft having a covering of soft, elastic material, a plurality of bearings spaced along said rollers in which said rollers are supported at intervals, the surfaces of said rollers being in continuous contact throughout their length, means for rotating said rollers, and means for causing berries to travel along the bite thereof.

13. In a machine of the class described, a pair of relatively long and slender rollers, and a plurality of bearings, spaced along said rollers, in which bearings said rollers are journaled at intervals, said bearings comprising means for supporting said rollers in such manner that their surfaces are in continuous contact throughout their length.

14. In a machine of the class described, a pair of relatively long and slender rollers, and a plurality of bearings, spaced along said rollers, in which bearings said rollers are journaled at intervals, each of said bearings comprising a pair of blocks, each block having in its face adjacent the other block a seat to receive the shaft of one of said rollers, and means for yieldingly pressing said blocks together, whereby said rollers are maintained in continuous contact throughout their length.

15. In a machine of the class described, a roller comprising a shaft covered with rubber, spaced bearings in which said roller is journaled at a plurality of pointes intermediate its ends, means for lubricating said bearings, and means for protecting the rubber covering from contact with the lubricant, said means comprising disks mounted on the shaft and arranged one at each side of each bearing.

16. A machine of the class described comprising a pair of substantially horizontal rollers mounted one above the other with their surfaces in contact, an endless belt arranged with its upper run extending along said rollers adjacent their bite, and means for causing said run of the belt to assume a transversely tilted position.

17. A machine of the class described comprising a pair of substantially horizontal rollers mounted one above the other with their surfaces in contact, an endless belt arranged with its upper run extending along said rollers adjacent their bite, means for causing said run of the belt to assume a transversely tilted position, with its lower edge disposed at an acute angle to the line of contact of said rollers, and means for adjusting said belt to vary said angle.

18. A machine of the class described comprising a pair of substantially horizontal rollers mounted one above the other with their surfaces in contact, a pair of belt pulleys disposed one adjacent each end of said rollers and mounted on axes at right angles to those of said rollers, an endless belt passing over said pulleys and having its upper run extending along and adjacent said rollers, and means for causing said run of the belt to assume a position transversely inclined toward said rollers.

19. In a machine of the class described, a substantially horizontal trough along which articles are caused to travel, one side of said trough being made up of a pair of co-operating pinching elements, arranged one above the other, and the other side of the trough consisting of a conveyer belt movable longitudinally of said pinching elements.

20. In a machine of the class described, a pair of susbtantially horizontal rollers mounted one above the other with their surfaces closely adjacent, means for rotating at least one of said rollers, an endless flexible apron passing around at least one roller, means for causing said apron to travel over its roller, and mechanism for causing the articles to be operated upon to travel along the bite of said rollers.

21. In a machine of the class described, the combination with pinching mechanism including a horizontal roller, of conveying mechanism mounted at one side of and adjacent said roller, and comprising a transversely inclined traveling belt extending longitudinally of said roller.

22. In a machine of the class described, the combination with pinching mechanism comprising a horizontal roller element and a co-operating element forming a bite therewith, of means for driving said elements, and traveling means for supporting the articles to be operated upon and for causing them to roll and tumble along the bite of said elements, so that the part of each article in contact with said elements is constantly changed as the articles travel.

23. In a berry capping and stemming machine, pinching mechanism comprising a substantially horizontal roller and a co-operating element forming a bite, said roller and co-operating element being disposed one above the other, so that the bite is at the side, means for driving said roller and co-operating element, and a transversely inclined conveyor belt extending longitudinally of and adjacent said bite, and serving to cause the berries to travel along the same 24. In a berry capping and stemming machine, the combination with pinching mechanism comprising a substantially horizontal roller and a co-operating element forming a bite, said roller and co-operating element being mounted one above the other, so that the bite is at the side, transversely inclined means for supporting the berries adjacent said bite and conveying them along the same, said supporting and conveying means being disposed further away from the bite at one end than at the other, whereby a progressively varying space is provided between the said supporting and conveying means, and such bite.

25. In a machine of the class described, and in combination, a plurality of juxtaposed operative units, each comprising pinching mechanism including a horizontal roller and a co-operating element forming a bite, said roller and co-operating element being disposed one above the other so that the bite is at the side, means for driving said roller and co-operating element, and a transversely inclined travelling conveyor belt extending longitudinally of and adjacent said bite, the belts of the several units being substantially parallel, a hopper, and means for feeding at a uniform rate from said hopper the articles to be operated upon and for distributing and delivering them upon the several conveyor belts.

In testimony whereof I affix my signature.

JOHN HERBERT STANSBURY.